United States Patent Office 2,815,292
Patented Dec. 3, 1957

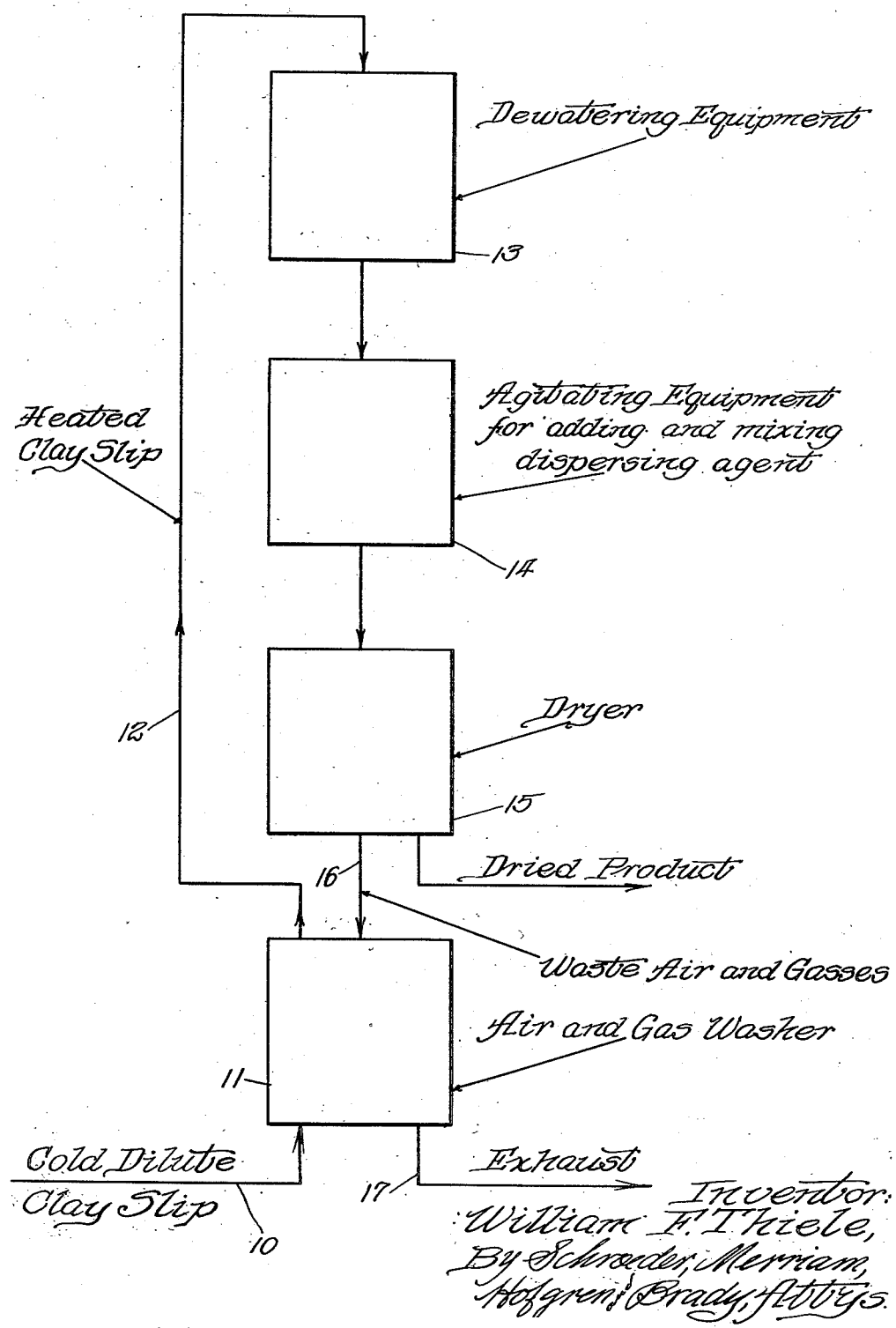

2,815,292
METHOD FOR DEWATERING CLAY

William F. Thiele, Wisconsin Rapids, Wis., assignor to Thiele Kaolin Company, a corporation of Georgia Application June 30, 1953, Serial No. 365,039

9 Claims. (Cl. 106—72)

This invention relates to the dewatering of clay and more particularly to a method for speeding up the removal of water from clay in conventional dewatering equipment.

The invention is primarily applicable to the finer grades of clay such as are used in coating of paper and the like. In preparing such clay for market, the mined clay is deflocculated in the conventional manner. Sand, grit and other gross particles are first removed by sedimentation, and then the clay is classified by further sedimentation process during which a flocculation having an average coarse content is removed and one having a finer average content is left behind. Both clays have a content roughly the same range of particle sizes, but the proportion of the different sizes is different.

After the classification, which may be by gravitation or by centrifugation, the residual material, which is the supernatant material where gravitational settling is employed and is the more liquid portion where centrifugation is used, is bleached during the course of which the material is flocculated again. If not bleached, it is flocculated anyway in the normal course to permit the dewatering. After flocculation, the larger particles settle rapidly, leaving supernatant liquid which may then be decanted or otherwise removed. Thereafter, a clay product of relatively high solids content remains for passage to the dewatering system which normally is a filter press or rotary vacuum filter, but may involve direct drying by drum driers, spray driers, or other drying equipment the latter of which evaporate water in the presence of air.

Where filtering equipment is employed, it is customary after the filtering again to deflocculate the material by mixing a dispersing agent with it and then passing it to a drier where heat is applied to drive off the water.

I have discovered that if the clay slip, prior to dewatering, is substantially heated it will lose water much more readily and rapidly. It is thus possible to operate filter presses either to remove a greater degree of water from the material in the same length of time or to remove the same amount of water as before in a very much shorter time. This may be accomplished, for example, by raising the temperature of the clay slip as little as 25° F. above its ambient temperature, but normally it is preferred to raise it 50° F. and not in any event to a temperature above 100° F. This may readily be done without the introduction of any extra heat to the system by passing the clay slip at some stage prior to flocculation or dewatering in heat exchange with the exhaust gases i. e., air and steam from the drier.

The invention is illustrated diagrammatically in the drawing which is in the form of a flow sheet. The cold clay slip from which water has been decanted is shown as entering at 10 to a heat exchanger 11 from whence it passes by the line 12 to dewatering equipment 13, which normally is a filter press that concentrates the slip without water evaporation. The filter cake is then taken to the agitator 14 where it is mixed with a dispersing agent and is then pumped or flows to the drier 15 where it is dried by hot gases. The hot gases and resulting steam from this drier pass through the line 16 to the heat exchanger 11, where they pass countercurrent to the incoming clay slip and are then exhausted as is indicated at 17.

No attempt is made to evaporate water from the clay in this interchange of heat, the invention depending not upon the removal of water from the clay in the heat exchanger but upon warming it to such a point that it will dewater itself more readily, particularly in the filter presses.

In fact, the dewatering ability of the heated slip is sufficiently great that in some instances, I have found it desirable to dewater the product without attempting to control the final moisture content and then, in order to dry the product at the most efficient point, add water to the extent of 12 to 15% in the agitating device. This is particularly true if the product is to be spray dried where it has been found that a solids content of about 67% is desirable. Dewatering may be employed to bring the solids content up to about 71%, after which water is added to bring the solids content down to the desired 67%.

The foregoing detailed description has been given for clearness of understanding only, and no unnecessary limitations should be understood therefrom, for some modifications will be obvious to those skilled in the art.

I claim:

1. In the preparation of clay, the steps comprising deflocculating aqueous raw clay, removing gross impurities therefrom, classifying the clay while still deflocculated, flocculating the classified clay, heating the flocculated classified aqueous clay substantially above ambient temperature but not to the boiling point, and dewatering the flocculated classified clay slip.

2. The method as set forth in claim 1 in which the clay is dewatered by a filtering operation.

3. The method as set forth in claim 1 in which the clay is dewatered by a filtering press operation.

4. In the preparation of clay, the steps comprising of deflocculating aqueous raw clay, removing gross impurities from the deflocculated clay, classifying the deflocculated clay, flocculating the classified clay, settling the flocculated classified clay, removing supernatant liquid from the flocculated classified clay to form a cold clay slip, heating the slip and then concentrating it by removing water by a physical separation means not involving evaporation of the water.

5. The method as set forth in claim 4 in which the dewatering is done by a filter press operation.

6. The method as set forth in claim 4 in which the temperature of the cold clay slip is raised at least about 50° F.

7. The method as set forth in claim 4 in which the clay slip, subsequent to heating and concentration by removal of water, is dried by the application of heat to evaporate water in the presence of air, and the mixture of air and steam so produced is employed to heat the cold dilute clay slip.

8. The method of dewatering a flocculated clay slip comprising heating the slip substantially above its ambient temperature, dewatering the heated slip by a physical process not involving evaporation of water to a water content lower than desired, adding a subsequent quantity of water and dispersing agent to the dewatered clay and evaporating the water from the clay until dry.

9. The method of dewatering a flocculated clay slip comprising heating the slip substantially above its ambient temperature, dewatering the heated slip by a physical process not involving evaporation of water to a water content lower than desired, adding a subsequent quantity of water and dispersing agent to the dewatered clay and evaporating the water from the clay by a spray drying process until the clay is dry.

References Cited in the file of this patent

UNITED STATES PATENTS

| | | |
|---|---|---|
| 2,007,742 | Brown | July 9, 1935 |
| 2,091,548 | Kaufman | Aug. 31, 1937 |
| 2,122,232 | Crockett | June 28, 1938 |
| 2,440,601 | Deckerman | Apr. 27, 1948 |
| 2,540,182 | Albert | Feb. 6, 1951 |